F. B. REYNOLDS.
BANK CHECK.
APPLICATION FILED MAR. 7, 1917.
1,280,548.
Patented Oct. 1, 1918.
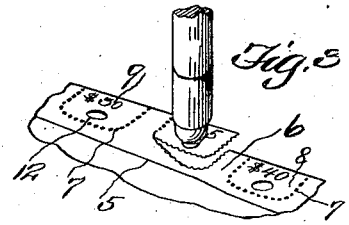
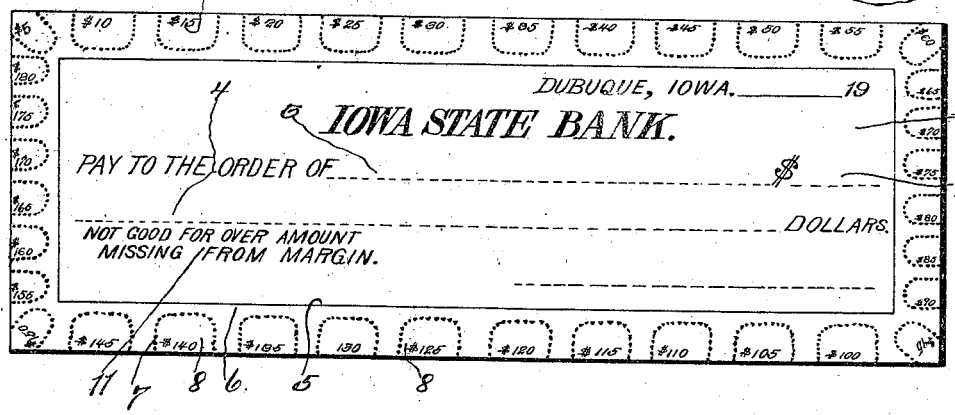
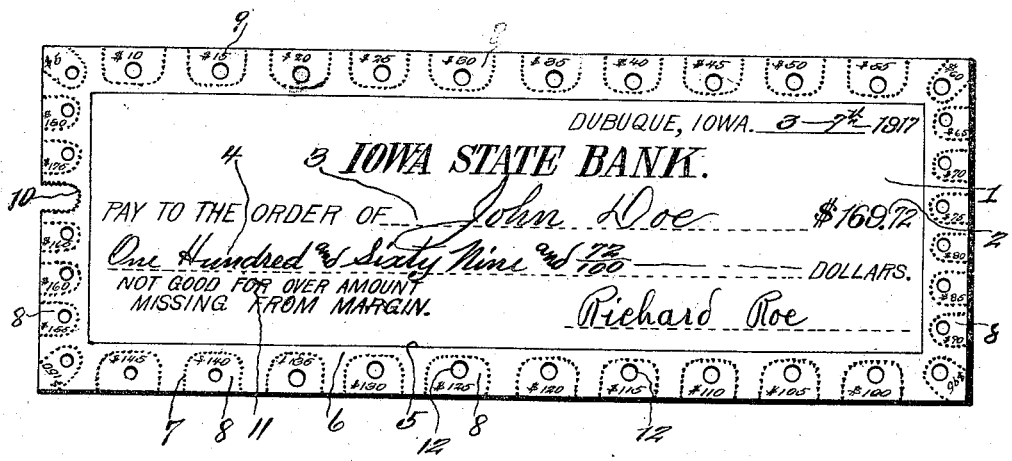
Inventor
Francis B. Reynolds,
Witnesses

UNITED STATES PATENT OFFICE.

FRANCIS B. REYNOLDS, OF DUBUQUE, IOWA.

BANK-CHECK.

1,280,548.　　　Specification of Letters Patent.　　Patented Oct. 1, 1918.

Application filed March 7, 1917. Serial No. 153,107.

*To all whom it may concern:*

Be it known that I, FRANCIS B. REYNOLDS, a citizen of the United States, residing at Dubuque, in the county of Dubuque, State of Iowa, have invented a new and useful Bank-Check; and I do hereby declare the following to be a full, clear, and exact description of the invention, such as will enable others skilled in the art to which it appertains to make and use the same.

This invention relates to an improved bank check, and one of the objects of the invention is the provision of a check which is non-raisable.

A further object of the invention is the provision of a bank check having its marginal portion so perforated as to form detachable parts or pieces, and which have printed thereon different amounts of dollars, from five dollars to a hundred and eighty dollars, inclusive, at intervals of five, say for instance, five, ten, fifteen and twenty, and so on, to a hundred and eighty. Any one of these parts may be detached by tearing the same on the line of perforation, it depending on the amount for which the check is drawn.

A further object of the invention is the provision of printed matter on the check, showing that the check is not payable over the amount that is missing from the margin of the check, thereby providing a check which is non-raisable.

A further object of the invention is to provide means to be carried by each one of these detachable sections or parts or pieces, to facilitate the detachment of the part.

In practical fields, the details of construcmay necessitate alterations falling within the scope of what is claimed.

The invention comprises further features and combination of parts, as hereinafter set forth, shown in the drawings, and claimed.

In the drawings:—

Figure 1 is a plan view of a blank check, constructed in accordance with the invention.

Fig. 2 is a plan view of the check, showing the same having been drawn for a certain amount, and illustrating one of said parts or pieces detached, thereby disclosing that the check cannot be raised over the amount which is missing from the marginal edge of the check.

Fig. 3 is a detail view, showing the manner for operation for detaching any one of the sections or pieces 8.

Referring more especially to the drawings, 1 designates a check, which may be of any suitable shape having a part to receive the amount (in figures) for which the check is to be drawn, as shown at 2, and a line 3 to receive the name to the order of whom the amount of the check is to be paid. The check is also provided with a suitable space or line on which the amount of the check is written in words, as shown at 4.

The face of the check is provided with a border line 5, which divides the marginal part of the check from the body of the check. This marginal portion 6 of the check is so perforated, as shown at 7, as to provide the detachable or separable sections, parts or pieces 8, which are arranged at spaced intervals throughout the marginal portion of the check. These pieces or sections 8 are provided with different amounts 9, at intervals of fives, from five to a hundred and eighty, inclusive, and for any one of which amounts the check may be drawn. In other words, the check cannot be drawn for an amount equal to the addition of any two or more amounts on said sections or pieces 8. In further words, it is the aim to draw the check for an amount not exceeding a hundred and eighty dollars. For instance, in Fig. 2, a check is illustrated, drawn for one hundred and sixty-nine and seventy-two hundredths dollars, and the section or piece 8 having a hundred and seventy dollars printed thereon has been detached from the margin of the check, as shown at 10. Printed on the face of the check are necessary directions 11 indicating that the person for whom the check is drawn shall not receive more than the amount of any single piece or section that is detached from the margin of the check. Therefore, John Doe, for whom the check in Fig. 2 is drawn, is not to receive more than a hundred and seventy dollars. Each section 8 in Fig. 2 is provided with a perforation 12, over which an eraser of a pencil may engage, to hold the section 8 against slipping on the desk, and so that the rubber eraser may engage through the perforation on to the desk, thereby facilitating the detaching of the section, while pulling on the body of the check. This operation of detaching any one of the sections or pieces, is shown in Fig. 3 clearly.

The invention having been set forth, what is claimed as new and useful, is:—

1. A check, having a border line dividing a marginal space from the body of the check, said marginal space being perforated, said perforations being arranged in a plurality of substantially U-form shapes at spaced intervals, thereby providing a plurality of U-shaped detachable sections having different amounts from five to a hundred and eighty at intervals of fives, only one section at a time being detachable, each detachable section having an enlarged perforation through which a rubber eraser extends to engage a desk or other support to facilitate the detaching of the section.

2. In a non-raisable check, a check body provided with a border line, and a marginal space divided from the body of the check by said border line, said marginal space being perforated, said perforations being arranged in a plurality of substantially U-formed shapes at spaced intervals thereby providing a plurality of U-shaped detachable sections having amounts printed thereon, any one of said amounts adapted to substantially correspond to the amount to be written in the body of the check, only one of said sections at a time being detachable, each detachable section having an enlarged perforation through its body, and through which perforation a rubber eraser end of a pencil may partially protrude to engage a desk or other support to facilitate the detaching of the section, said enlarged perforation being spaced within and away from the perforations forming the U-formed sections, whereby when the rubber eraser end substantially protrudes through the perforation and spreads to engage the marginal edge of the perforations, the U-formed section may be torn on the U-formed arranged score of perforations without tearing the section, or the body of the check.

In testimony whereof I have signed my name to this specification in the presence of two subscribing witnesses.

FRANCIS B. REYNOLDS.

Witnesses:
ROBERT H. JONES,
G. N. REILLY.